(12) United States Patent
Kramer

(10) Patent No.: US 6,666,712 B1
(45) Date of Patent: Dec. 23, 2003

(54) REMOTELY SWITCHED PORTABLE OUTLET

(75) Inventor: Ronald A. Kramer, Dublin, OH (US)

(73) Assignee: Bandon Corp., Dublin, OH (US)

( * ) Notice: Subject to any disclaimer, the term of this patent is extended or adjusted under 35 U.S.C. 154(b) by 0 days.

(21) Appl. No.: 10/068,208

(22) Filed: Feb. 6, 2002

(51) Int. Cl.[7] ............................................. H01R 13/72
(52) U.S. Cl. ....................... 439/501; 439/652; 439/535; D13/139.8
(58) Field of Search ................................ 439/501, 652, 439/535; D13/139.8; 174/48

(56) References Cited

U.S. PATENT DOCUMENTS

| | | |
|---|---|---|
| 4,867,701 A | 9/1989 | Wiand |
| 5,424,903 A * | 6/1995 | Schreiber ................... 361/166 |
| D411,169 S * | 6/1999 | West ...................... D13/139.8 |
| 6,077,109 A | 6/2000 | Prazoff |
| 6,211,581 B1 * | 4/2001 | Farrant ....................... 307/117 |
| D448,730 S | 10/2001 | Lee |
| 6,325,665 B1 * | 12/2001 | Chung ....................... 439/501 |

OTHER PUBLICATIONS

Target brand footswitch package.
Tripp–Lite Surge Suppressors (web page).

* cited by examiner

Primary Examiner—Renee Luebke
Assistant Examiner—Ann McCamey
(74) Attorney, Agent, or Firm—Frank H. Foster; Kremblas, Foster, Phillips & Pollick

(57) ABSTRACT

A portable, switchable electric extension outlet having a manually actuable switch which is remote from the outlet enclosure and is connected to the enclosure by a remote control cord, other than the outlet's power cord. The enclosure end of the remote control cord is connected to an electrical circuit in the enclosure which connects an electrical power source to receptacles mounted to the enclosure. The manually actuable switch alternatively completes or breaks the electrical circuit's connection between the power source and the receptacles.

6 Claims, 3 Drawing Sheets

REMOTELY SWITCHED PORTABLE OUTLET

CROSS-REFERENCES TO RELATED APPLICATIONS (Not Applicable)

STATEMENT REGARDING FEDERALLY-SPONSORED RESEARCH AND DEVELOPMENT (Not Applicable)

Reference to a "Microfiche appendix"

(Not Applicable)

BACKGROUND OF THE INVENTION

1. Field of the Invention

This invention relates to improved portable, switched electric outlets having an enclosure containing one or more electrical receptacles that are wired in a parallel circuit, as well as to portable, switched electric receptacles that share a common enclosure with other portable electrical devices.

2. Description of the Related Art

Portable, switched electric outlets, of which the power strip is a common example, typically consist of an enclosure containing a power switch and an electrical circuit connecting the electric source to one or more receptacle sockets wired in parallel that receive an electrical plug, which device is connected to an external power source by a supply cord and plug. The switch allows the user to simultaneously turn all the receptacles on or off with a single throw of the switch. More elaborate versions may also include or substitute individual switches for particular receptacles, and/or contain circuit breakers, surge or lightning protection, voltage regulation, power conditioning, radio frequency and electromagnetic interference filters, power-on indicator lights, or an uninterruptible power source (UPS) containing batteries. Telephone, data, television and other such telecommunication lines are sometimes routed through portable switched outlets for purposes such as surge protection. These portable switched outlets may be made in many shapes, such as rectangles, octagons, semicircles, with receptacles located in rows, rectangles, or other configurations located on various surfaces of the enclosure. Such outlets can be incorporated in or attached to other devices such as a UPS, and are included within the scope and intent of this invention. All of the foregoing devices are collectively hereinafter referred to as "portable switched outlets" for convenience and conciseness.

With the popularity of desktop computers, portable switched outlets have become ubiquitous. Due to unsightliness, logistics or other reasons, the portable switched outlet is often located in some hard to reach place such as behind a desktop computer or on the floor as shown in FIG. 1, requiring the user to reach this inconvenient location each time the portable switched outlet is turned on or off.

One prior art portable outlet, Prazoff U.S. Pat. No. 6,077,109, provides for storage of its power supply cord within an open chamber of the outlet enclosure. Lee, D448,730 S, discloses a retractable power supply cord stored within a multi-outlet caddy. As will be seen, the third preferred form of the present invention stores its remote control cord and remote control switch in a cavity within the outlet enclosure, and differs from, and is an improvement to the prior art in several respects: In this preferred embodiment of the present invention, (1) the cavity does not store the power supply cord, (2) the cavity is fully enclosed by means of a movable closure such as a door or cap, (3) the cavity may contain a socket for receiving a plug attached to the stored remote control cord, (4) the cavity can also store a power switch, and (5) the cavity can be much smaller than the prior art cord storage areas by virtue of the relay switching used.

BRIEF SUMMARY OF THE INVENTION

It is a purpose of this invention to permit a portable switched outlet to be remotely switched by means of a remote switch that is located outside the portable switched outlet, which switch is connected to the portable switched outlet by means of a remote control cord that is distinct from the electrical power supply cord connecting the portable switched outlet to the external power source. In the first three preferred embodiments electric current is switched by a relay located within the portable switched outlet. This relay is controlled by a remote switch located outside the portable switched outlet, which remote switch is connected to the relay by the remote control cord. The remote control cord couples a control signal from the remote control cord to the relay. Examples of such a control signal are an electric current conducted through an electrical conductor or a light or laser beam passing through a fiber optic cable. As used herein, the term "relay" is broadly defined as any device, component or circuit capable of switching on and off the flow of electricity through an electric circuit under the control of a signal applied to the relay.

In the fourth preferred embodiment no relay is utilized. In this embodiment, the flow of electricity which has entered the portable switched outlet is interrupted at a point within said outlet that is ahead of the receptacles being switched, and the current is there diverted into a remote cord and a remote switch which are located outside the outlet enclosure. When the contacts in the remote switch are closed current is allowed to pass through the remote switch and flow back through another leg of the remote control cord into the outlet and its receptacles.

In all versions of preferred embodiment, the housing which contains the remote power switch can also contain additional switches for switching individual receptacles or for switching other devices, such as a UPS, that may share a common enclosure with the portable switched outlet. In the case of the first three preferred embodiments, such additional switches would require the use of additional relays within the portable switched outlet, which would be wired in the same manner as the circuit described herein. The remote power switch housing can also contain status indicators for the portable switched outlet, such as power on-off indicator lights, or status indicators such as battery charge level for a UPS sharing a common enclosure with the portable switched outlet.

Any of the foregoing switches, lights or indicators, including the main power switch, may be duplicated in the main enclosure of the portable switched outlet in order to afford redundancy. The main enclosure may also contain outlets that are not switched.

The remote control cord may be removeably or permanently attached to the portable switched outlet or to the remote switch or the remote switch housing. This allows, for example, the routing of the remote control cord through openings that are too small to pass the remote switch or its housing, or the substitution of different lengths of remote control cords or different remote switches. The point at which the remote control cord enters the outlet enclosure may vary from the locations indicated in the preferred forms, and is not critical to this invention.

Figure 1:
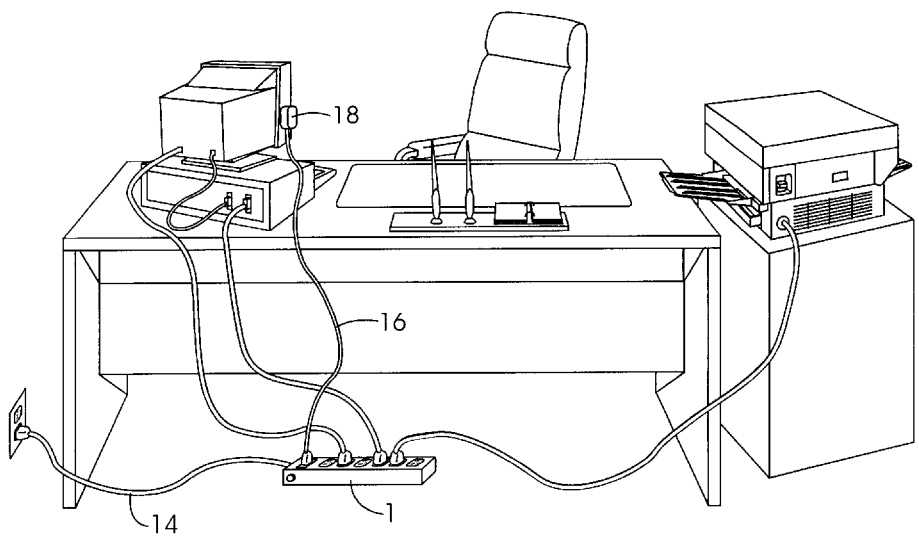
FIG. 1 is a view in perspective of an embodiment of the invention in operable association with computer equipment.

In describing the preferred embodiments of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

A typical use of the present invention is shown in FIG. 1. Portable switched outlet 1 is plugged into a wall outlet by power cord 14. Remote control switch 18 is connected to portable switched outlet 1 by remote control cord 16.

As used herein the term "cord" is broadly used to mean an individual or plurality of flexible, energy conductors such as a insulated wire, or fiber optic cable. The individual conductors comprising the remote control cord may be arranged in a variety of ways, such as side by side or twisted, and need not be enclosed in a common sheathing or covering. Furthermore, individual conductors of the remote control cord may not be in physical contact with each other. Such conductors may be physically split into separate runs and still defined herein as part of the remote control cord.

Figure 2:
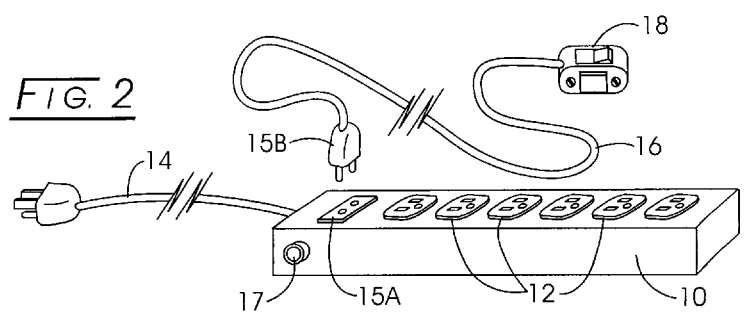
FIG. 2 is a view in perspective of a first preferred embodiment of the invention.

FIG. 2 shows the exterior of a portable switched outlet comprising the first preferred form of the present invention. The portable switched outlet generally is comprised of an enclosure 10 encasing a plurality of electrical receptacles 12. The shape of main enclosure 10 is not critical to this invention, nor is the arrangement, location, type or number or receptacles 12. As shown in FIG. 2, extending from main enclosure 10 is power supply cord 14 which connects the internal wiring of the portable switched outlet to an electrical source such as a wall or floor mounted electrical receptacle. Extending from main enclosure 10 is remote control cord 16 which connects internal relay 30 (shown schematically in FIG. 3) to remote switch 18. In FIG. 2 remote control cord 16 is shown as removeably attached to the portable switched outlet by means of remote control cord socket 15A and remote control cord plug 15B. For safety reasons this socket and plug should be physically incompatible with receptacles 12. Alternatively, remote control cord 16 may be permanently attached to the internal wiring of the portable switched outlet. Remote switch 18 is directly mounted to the end of the cord as shown. Reset button 18 is connected to a circuit protector and breaker located inside main enclosure 10.

Figure 3:
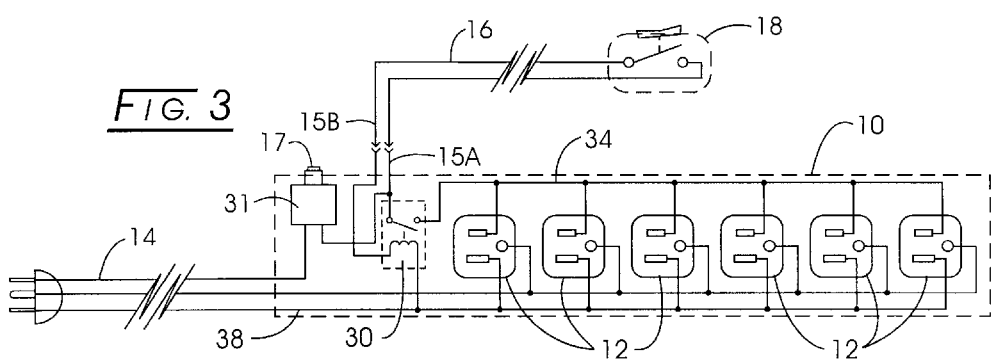
FIG. 3 is a schematic diagram of the first preferred embodiment of the invention.

FIG. 3 schematically depicts the circuitry of the first preferred embodiment shown in FIG. 2. The circuitry includes an electrical circuit connecting an electrical source, applied by the cord 14, in parallel connection to the receptacles 12. Relay 30 makes or breaks the flow of electricity through bus wiring 34, thereby switching the flow of current through receptacles 12. Although FIG. 3 depicts only one leg of the circuit being switched, both legs can instead be switched by the use of a double pole relay which would make or break bus wiring 34 and 38. Relay 30 is controlled by remote switch 18 which is connected to the relay by remote control cord 16. Although the relays depicted in FIG. 3 and later in FIGS. 6 and 9 use electro-magnetically operated contacts, other types of relays, such as solid state relays, that may be capable of switching the rated voltage and amperage of the portable switched outlet, are within the scope and spirit of this invention. Remote switch 18 is connected to the end of remote control cord 16 as shown, or mounted in a housing as depicted below. Reset button 17 is connected to circuit protector and breaker 31 located inside enclosure 10.

Remote switch 18 can be either of the continuous on-off type, of which type the common wall light switch is an example, or of the momentary-on type, of which type the doorbell button is an example. Use of the continuous type switch means that the relay should be of the normally-open type that will only conduct current to the receptacles 12 only so long as the remote switch is on and sending a control signal to the relay, or the normally-closed type that will only conduct current to receptacles 12 so long as the remote switch is not sending a control signal to the relay. Use of the momentary type switch requires that the relay be of the type that retains its on or off mode until the remote switch is next momentarily operated, sometimes referred to as a sequencing relay. The continuous type switch and normally open relay are favored in the first three preferred forms of this invention.

Figure 4:
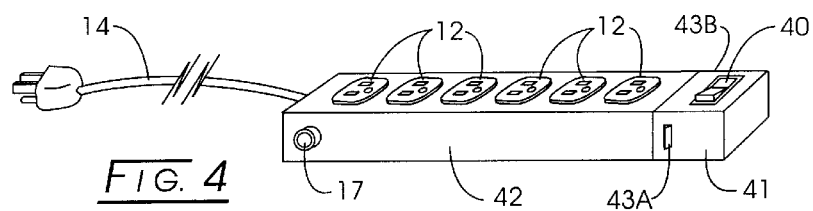
FIGS. 4 and 5 are views in perspective of a second preferred embodiment of the invention.
Figure 5:
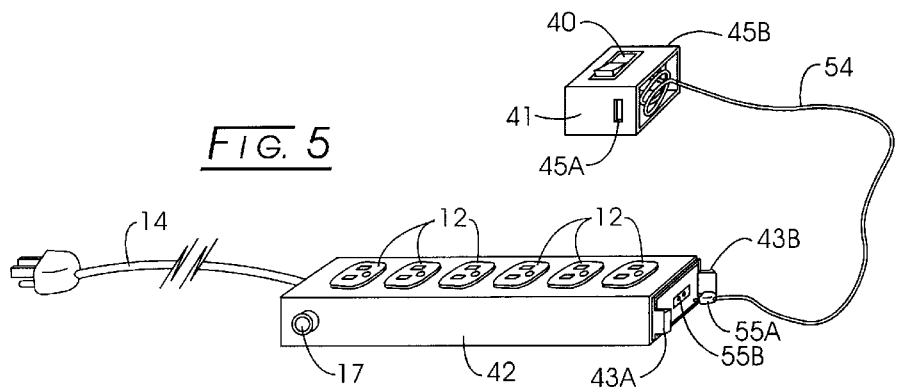

FIGS. 4 and 5 collectively show exterior views of a second preferred form of the invention, which incorporate the relay switching circuitry of FIG. 3. In this embodiment remote control switch 40 is enclosed in remote switch enclosure 42, which enclosure is removably attached to main enclosure 42 by means of tabs 43A and 43B which fit into corresponding openings 45A and 45B. Attached to remote control switch 40 is remote control cord 54, which cord can be stored within remote switch enclosure 41 in the manner shown in FIG. 5. Remote control cord 54 terminates at the other end in plug 55A which plugs into socket 55B. The means of attaching remote switch enclosure 41 to main enclosure 42 is not critical to this invention, and one skilled in the art could devise other acceptable means. Likewise, the shape and relative locations of the main enclosure and the remote switch enclosure may take many different forms and still conform to the scope and intent of this invention. The place at which the remote switch enclosure 41 attaches to the main enclosure 42 is not critical to this invention, nor is its means and manner of attachment. Remote switch 40 may be mounted on any side of remote switch enclosure 41 where space permits. Any arrangement of these components which utilize the circuitry described herein is within scope and spirit of this invention. The drawings merely show one possible configuration for purposes of illustration and example.

As disclosed in the Summary of Invention, remote switch enclosure 41 may also contain additional switches, lights or other indicators.

Velcro or other attachment means may be used to attach the remote switch or remote switch enclosure to convenient surface, such as the side of a computer monitor as shown in FIG. 1.

Figure 6:
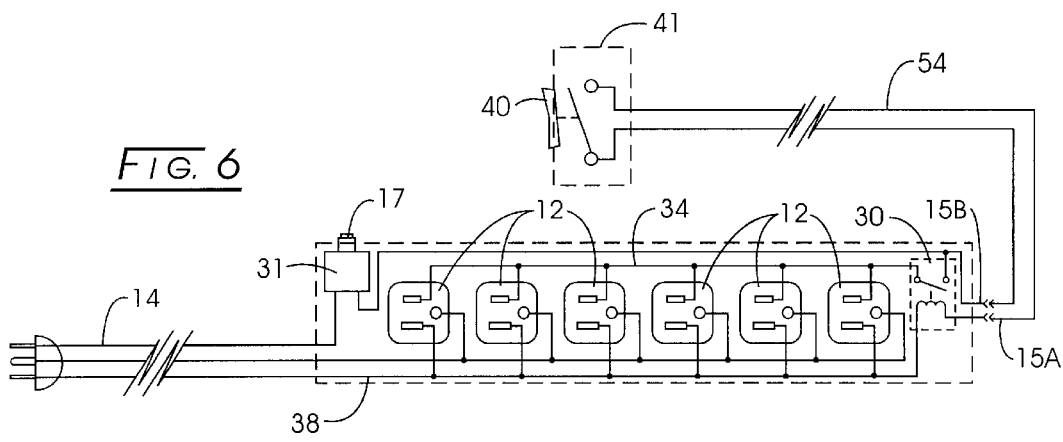
FIG. 6 is a schematic diagram of the circuit of the embodiment illustrated in FIGS. 4 and 5.

FIG. 6 is a schematic of the specific circuitry incorporated in the embodiments depicted in FIGS. 4 and 5, and only differs from FIG. 3 in the location of the relay, wiring layout, and depiction of remote switch 40 located in remote switch enclosure 41.

Figure 7:
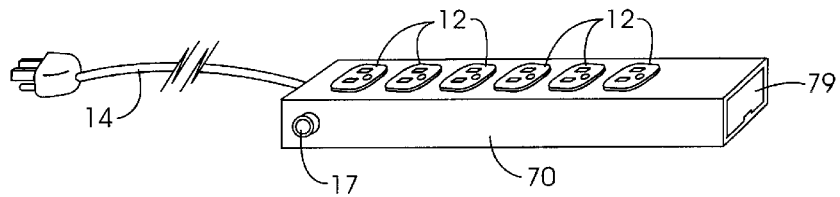
FIGS. 7 and 8 are views in perspective of a third preferred embodiment of the invention.
Figure 8:
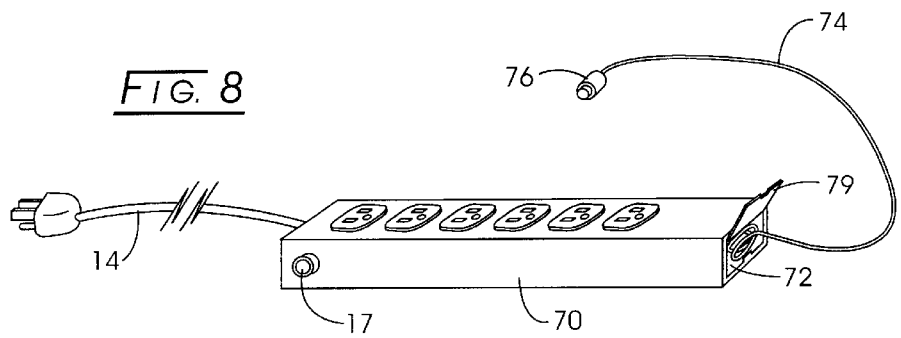
Figure 9:
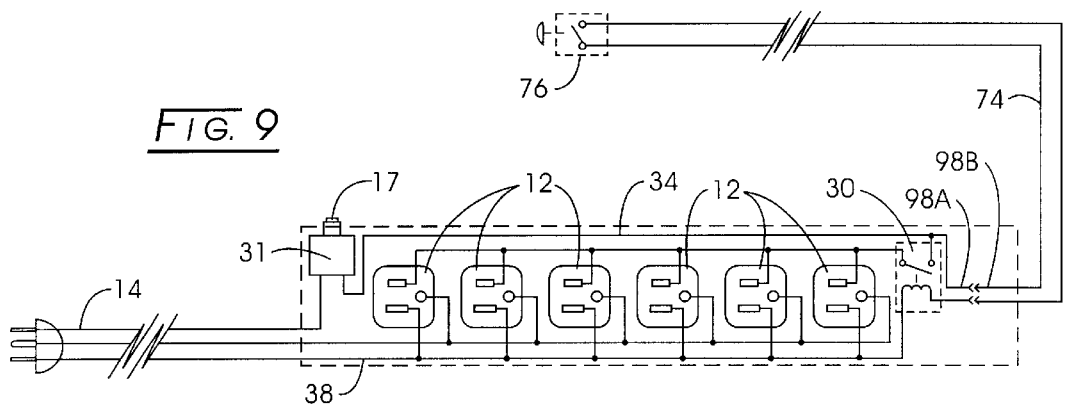
FIG. 9 is a schematic diagram of the circuit of the embodiment illustrated in FIGS. 7 and 8.

FIG. 7 and FIG. 8 are exterior views of a third preferred form of this invention, incorporating the relay switching circuitry of FIG. 9. The end of main enclosure 70 forms a storage cavity 72 into which remote control cord 74 and remote switch 76 may be stored. A wall may separate storage cavity 72 from the rest of the interior of enclosure 70. The end of the remote control cord 74 opposite remote switch 76 is removeably attached to main enclosure 72 by means of plug 98A which is inserted into socket 98B (shown schematically in FIG. 9) located in said storage cavity 72. Alternatively, the control cord may be permanently attached to the main enclosure. Hinged door 79 encloses the storage cavity 72, and is an example of other forms of movable or removable cavity entrance closures that may be used to enclose the cavity, such as caps, lids or slides. These may be held in place by frictions, clips, snaps, hinges, grooves or other means that are well known in the art of enclosure design, and are within the scope and spirit of this invention. Alternatively, hinged door 79 may be omitted and some other means used to retain the remote control cord and remote switch in the storage cavity, such as a friction fit of the cord and switch, or a clip or clips located within the storage cavity into which the cord or switch are located during storage.

FIG. 9 is a schematic of the specific circuitry incorporated in the embodiments depicted in FIGS. 7 and 8, and only differs from FIG. 6 in the depiction of the remote switch.

The first three preferred embodiments utilize an electrical signal to control the relays. Examples of other types of control signal are a light or laser. One skilled in the art of optical transmission and control could replace the electrical control signal with a light or laser control signal. One possible means of doing so is to locate a light or laser transmitter/receiver inside the outlet enclosure. The transmitter sends a light or laser remote control signal into a fiber optic remote control cord. This signal is switched by a remote control switch that is capable of blocking or passing the signal. The signal returns to the receiver and is there converted into an electrical signal that operates a relay.

Figure 10:
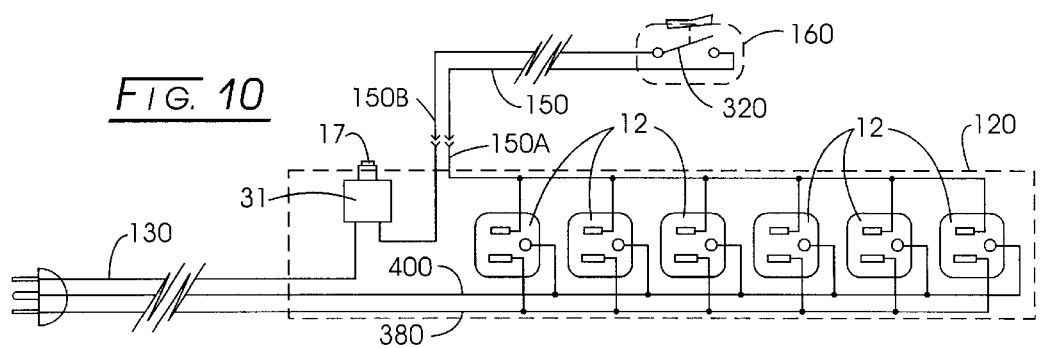
FIG. 10 is a schematic diagram of the circuit of a fourth embodiment of the invention.

FIG. 10 is a schematic of the wiring of a fourth and alternative preferred circuit to that shown in FIGS. 3, 6, 9 and 10. A relay is not used. Instead, electricity enters the enclosure 120 of the portable switched outlet through power supply cord 130. One leg of the current passes through circuit protector and breaker 31, and then flows into remote control cord 150 via remote control cord socket 150A and plug 150B. The current is then switched on or off by remote switch 160 by means of said switch's internal contacts 320. If contact within the switch is made, the electrical circuit is completed and electricity can flow through remote control cord 150, bus wiring 340 and 380, and receptacles 12. While the use of circuit breaker 31 is desirable, its use or location with enclosure 120 is not critical to this invention. The circuit breaker may alternatively be located or combined with remote control switch 160. Two prong receptacles may be used instead of 3 prong receptacles in all preferred forms of the invention, in which case bus wiring 400 is eliminated. While FIG. 3 shows only one leg of the circuit being switched, both legs of the circuit can be switched by the use of a double pole remote control switch and additional wiring in the remote cord.

One advantage of the relay switching disclosed schematically in FIGS. 3, 6 and 9 as compared to the non-relay switching depicted schematically in FIG. 10 is that relay switching permits the use of smaller gauge remote control cord wiring and a smaller, lower rated control switch. This is because said wiring and switch only need to conduct a small current in order to control relay 30. The, smaller diameter remote control cord facilitates its storage in a much smaller remote control enclosure 41, and facilitates the storage of the cord and switch in a much smaller cavity 72, than would otherwise be required to receive the wiring and switch if the circuitry of FIG. 10 was employed instead, and they were required to carry the full voltage and current of the portable switched outlet of this invention.

The above is a description of the preferred forms of this invention. It is possible that modifications of the structures and circuitry shown here may occur to those skilled in the art that will still fall within the scope of the following claims. It should therefore be appreciated that a latitude of modifications, change and substitution is intended in the foregoing disclosure, and in certain instances, some features of the invention will be employed without a corresponding use of other features. Accordingly, it is appropriate that the following claims be construed broadly and in a manner consistent with spirit and the scope of the invention.

What is claimed is:

1. An improved portable, switchable electric outlet connectable to an electrical source by a power supply cord and having an outlet enclosure containing an electrical circuit connecting the electrical source in parallel circuit connection to at least one electrical receptacle, wherein the improvement comprises:

a manually actuable switch which is remote from the outlet enclosure and connected to said outlet enclosure by a remote control cord other than the outlet's power supply cord, the switch being located in a remote switch enclosure that is separate from the outlet enclosure, the remote switch enclosure being removably attachable to the outlet enclosure by an attachment means other than the remote control cord, an outlet enclosure end of the remote control cord being connected, within said outlet enclosure, to said electrical circuit to alternatively cause the electrical circuit's connection of the power source to said receptacle to be completed or broken.

2. A portable, switchable electric outlet in accordance with claim 1 wherein a cavity is incorporated in said remote switch enclosure for receiving and storing the remote control cord.

3. The improved switchable electric outlet of claim 2, wherein the remote switch enclosure incorporates multiple power switches, each power switch controlling electrical current through an individual receptacle.

4. The improved switchable electric outlet of claim 3, wherein the remote control enclosure incorporates operational indicators.

5. The improved switchable electric outlet of claim 1, wherein the remote switch enclosure incorporates multiple power switches, each power switch controlling electrical current through an individual receptacle.

6. The improved switchable electric outlet of claim 5, wherein the remote control enclosure incorporates operational indicators.

* * * * *